US012315212B2

(12) United States Patent
Ranganathan et al.

(10) Patent No.: US 12,315,212 B2
(45) Date of Patent: May 27, 2025

(54) REAL-TIME OCCLUSION REMOVAL USING SYNTHETIC PIXEL GENERATION

(71) Applicant: Verizon Patent and Licensing Inc., Basking Ridge, NJ (US)

(72) Inventors: Prakash Ranganathan, Tamilnadu (IN); Saurabh Tahiliani, Uttar Pradesh (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 436 days.

(21) Appl. No.: 17/568,770

(22) Filed: Jan. 5, 2022

(65) Prior Publication Data

US 2023/0215128 A1  Jul. 6, 2023

(51) Int. Cl.
| | |
|---|---|
| *G06V 10/26* | (2022.01) |
| *G06V 10/82* | (2022.01) |
| *G06V 20/40* | (2022.01) |
| *G06V 20/52* | (2022.01) |
| *G06V 40/10* | (2022.01) |

(52) U.S. Cl.
CPC ............ *G06V 10/273* (2022.01); *G06V 10/82* (2022.01); *G06V 20/41* (2022.01); *G06V 20/52* (2022.01); *G06V 40/103* (2022.01)

(58) Field of Classification Search
CPC ...... G06V 20/52; G06V 10/62; G06V 10/273; G06V 20/41; G06V 20/70; G06V 10/764; G06V 10/25; G06V 10/82; G06T 7/246; G06T 7/251; G06T 2210/12; G06T 5/77; G06N 3/0475
See application file for complete search history.

(56) References Cited

U.S. PATENT DOCUMENTS 7,230,653 B1 *   6/2007   Overton .................. H04N 5/272
                                                       382/284
2006/0268111 A1 * 11/2006  Zhang .................... G01S 3/7864
                                                       348/169
(Continued)

FOREIGN PATENT DOCUMENTS

WO    WO-2020094091 A1 *  5/2020 ............. G06V 20/46

OTHER PUBLICATIONS

Hou et al., "VRSTC: Occlusion-Free Video Person Re-Identification," Proceedings of the IEEE/CVF Conference on Computer Vision and Pattern Recognition (CVPR), 2019, pp. 7183-7192 (Year: 2019).*

(Continued)

*Primary Examiner* — Ming Y Hon
*Assistant Examiner* — Julia Z. Yao

(57) ABSTRACT

Systems and methods described herein utilize synthetic pixel generation using a custom neural network to generate synthetic versions of objects hidden by occlusions for effective detection and tracking. A computing device stores an object detector model and a synthetic image generator model; receives a video feed; detects objects of interest in a current frame of the video feed; identifies an occluded object in the current frame; retrieves a previous frame from the video feed; generates synthetic data based on the previous frame for the occluded object; and forwards a modified version of the current frame to an object tracking system, wherein the modified version of the current frame includes the synthetic data.

20 Claims, 10 Drawing Sheets

(56) References Cited

U.S. PATENT DOCUMENTS

| | | | |
|---|---|---|---|
| 2013/0051613 A1* | 2/2013 | Bobbitt | G06V 20/52 |
| | | | 382/103 |
| 2014/0119604 A1* | 5/2014 | Mai | G06V 20/00 |
| | | | 382/103 |
| 2015/0310274 A1* | 10/2015 | Shreve | G06T 7/20 |
| | | | 382/103 |
| 2016/0350587 A1* | 12/2016 | Bataller | G06V 20/49 |
| 2022/0036056 A1* | 2/2022 | Sato | G06V 40/10 |
| 2022/0083783 A1* | 3/2022 | Subramanian | G06T 7/246 |

OTHER PUBLICATIONS

Wu et al., "RGBD temporal resampling for real-time occlusion removal," 2019, In Proceedings of the ACM SIGGRAPH Symposium on Interactive 3D Graphics and Games (I3D '19). Association for Computing Machinery, New York, NY, USA, Article 7, 1-9. https://doi.org/10.1145/3306131.3317025 (Year: 2019).*

Saleh et al., "Occlusion Handling in Generic Object Detection: A Review," 2021 IEEE 19th World Symposium on Applied Machine Intelligence and Informatics (SAMI), Herl'any, Slovakia, 2021, pp. 000477-000484, doi: 10.1109/SAMI50585.2021.9378657. (Year: 2021).*

Patwardhan et al., "Video inpainting of occluding and occluded objects," IEEE International Conference on Image Processing 2005, Genova, Italy, 2005, pp. II-69, doi: 10.1109/ICIP.2005.1529993. (Year: 2005).*

Patwardhan et al., "Video Inpainting Under Constrained Camera Motion," in IEEE Transactions on Image Processing, vol. 16, No. 2, pp. 545-553, Feb. 2007, doi: 10.1109/TIP.2006.888343. (Year: 2007).*

Thuc Trinh Le. Video inpainting and semi-supervised object removal. Image Processing [eess.IV]. Université Paris Saclay (COmUE ), 2019. English. NNT : 2019SACLT026. tel-02382805 (Year: 2019).*

Hirohashi et al., "Removal of Image Obstacles for Vehicle-mounted Surrounding Monitoring Cameras by Real-time Video Inpainting, " Proceedings of the IEEE/CVF Conference on Computer Vision and Pattern Recognition (CVPR) Workshops, 2020, pp. 214-215 (Year: 2020).*

Cheung et al., "Protecting and Managing Privacy Information in Video Surveillance Systems," 2009, In: Senior, A. (eds) Protecting Privacy in Video Surveillance. Springer, London. https://doi.org/10.1007/978-1-84882-301-3_2 (Year: 2009).*

Nasseri et al., "Simple online and real-time tracking with occlusion handling," 2021, arXiv, in Computing Research Repository (CoRR), 2020, vol. abs/2103.04147. (Year: 2021).*

Kim et al., "Deep Video Inpainting," 2019 IEEE/CVF Conference on Computer Vision and Pattern Recognition (CVPR), Long Beach, CA, USA, 2019, pp. 5785-5794, doi: 10.1109/CVPR.2019.00594. (Year: 2019).*

Chang et al., "VORNet: Spatio-Temporally Consistent Video Inpainting for Object Removal," 2019 IEEE/CVF Conference on Computer Vision and Pattern Recognition Workshops (CVPRW), Long Beach, CA, USA, 2019, pp. 1785-1794, doi: 10.1109/CVPRW.2019.00229. (Year: 2019).*

* cited by examiner

REAL-TIME OCCLUSION REMOVAL USING SYNTHETIC PIXEL GENERATION

BACKGROUND

Object detection and tracking are prominent applications of computer vision. Computer vision models may include a convolutional neural network (CNN) and/or another type of deep learning neural network trained to identify objects, such as people, vehicles, signs, etc. In real-world scenarios, there are various types of occlusions in the environment which create major challenges in effective detection and tracking of objects.

DETAILED DESCRIPTION OF EXAMPLE EMBODIMENTS

The following detailed description refers to the accompanying drawings. The same reference numbers in different drawings may identify the same or similar elements.

Systems and methods described herein apply synthetic pixel generation using a custom neural network to generate synthetic versions of objects hidden by occlusions for effective detection and tracking. The synthetic versions may be used by computer vision systems to more accurately detect and track objects in real time.

Figure 1:
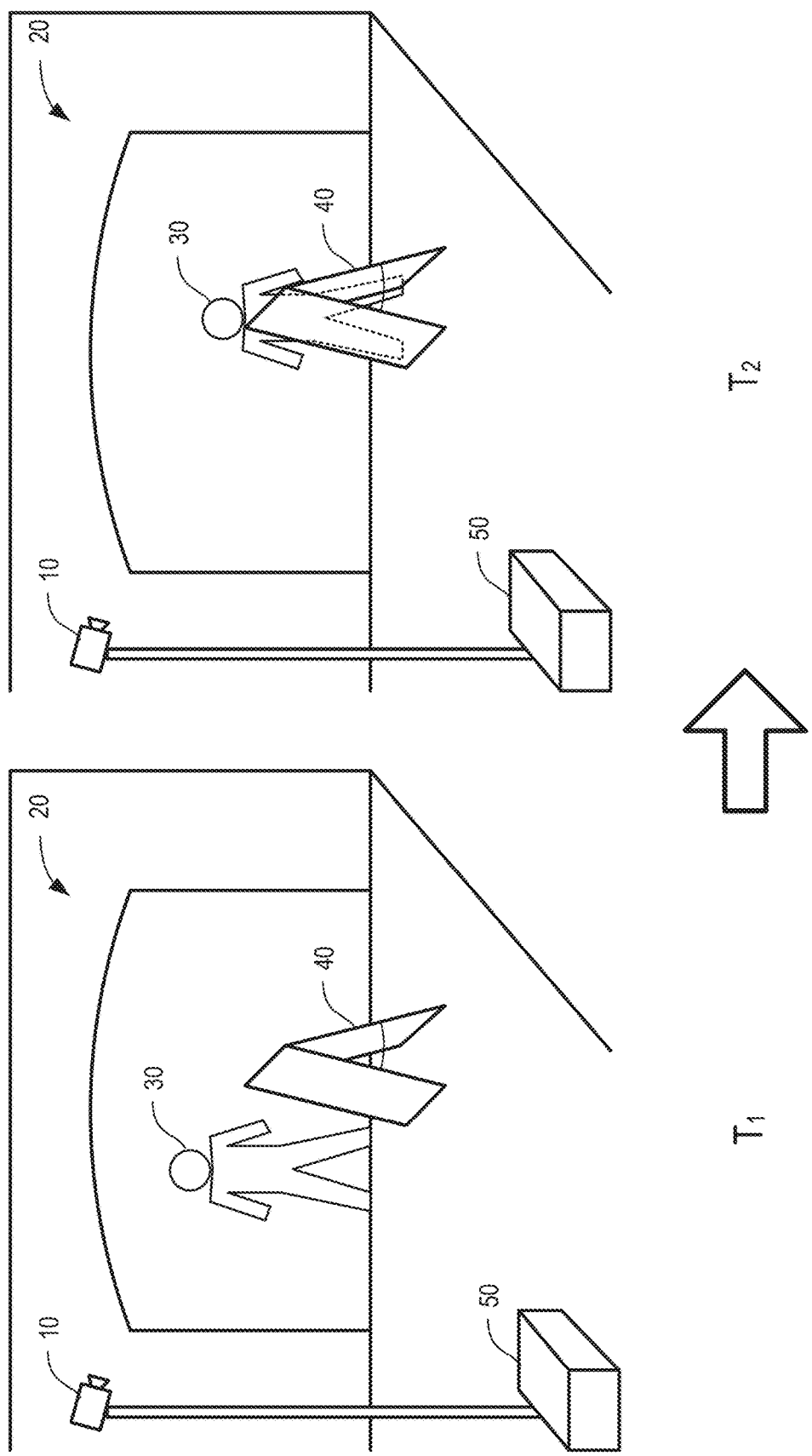
FIG. 1 is a diagram illustrating concepts described herein.

FIG. 1 is a diagram illustrating concepts described herein. A camera 10 may be configured to collect video images of an area 20. The camera may obtain images or frames that may be interpreted using computer vision. For example, camera 10 may include a fixed camera that provides images for a security system or occupant tracking system in a warehouse or retail environment. Assume that camera 10 obtains a first frame captured at a first time $T_1$ and a second frame captured at a time $T_2$. The computer vision system may use images from camera 10 to track a particular object (e.g., a person 30), which may be discernable based on a certain combination of features (e.g. size, color, shape, etc.). When person 30 moves within area 20, the camera's view of person 30 may become occluded (e.g., obstructed from view) or partially occluded by one or more objects 40. Objects 40 may include, for example, a fixed object (such as a sign, display, counter, shelf, etc.) or a movable object (such as a cart, another person, etc.).

The occlusion of person 30 may block the camera's view of certain features of person 30, which may prevent accurate detection and tracking by a computer vision system. For example, the visible features of person 30 at time $T_1$ and the visible features of person 30 at time $T_2$ may appear different with respect to images obtained by camera 10. The different appearance of person 30 in each frame may and prevent accurate detection of person 30 by the computer vision system, which may result in double counting or other automated tracking errors. While embodiments described herein are described in the context of real-time occlusion removal with respect to a person, in other implementations systems and methods described herein may also apply to other objects of interest, such as animals (e.g., in a kennel, zoo, etc.), vehicles (e.g., vehicle counting, parking management, or other traffic scenarios), etc.

According to implementations described herein, a real-time occlusion removal system is provided to improve accuracy of computer vision systems. A synthetic version of an occluded object (e.g., person 30) may be generated over, or in place of, an occluding object 40 to provide an image that allows for more accurate tracking by a computer vision system (not shown). The synthetic version may be generated, for example, by a real-time occlusion removal system 50 based on the unobstructed view of person 30 from a previous frame (at time $T_1$) and inserted into the frame of time $T_2$ to provide a modified real-time image to the computer vision system. The synthetic version of the occluded object may, for example include features sufficient to match person 30 in the fame of time $T_2$ with person 30 in the fame of time $T_1$. Thus, the insertion of real-time synthetic pixels by real-time occlusion removal system 50 can reduce false detections and improve accuracy of results from the computer vision system.

Figure 2:
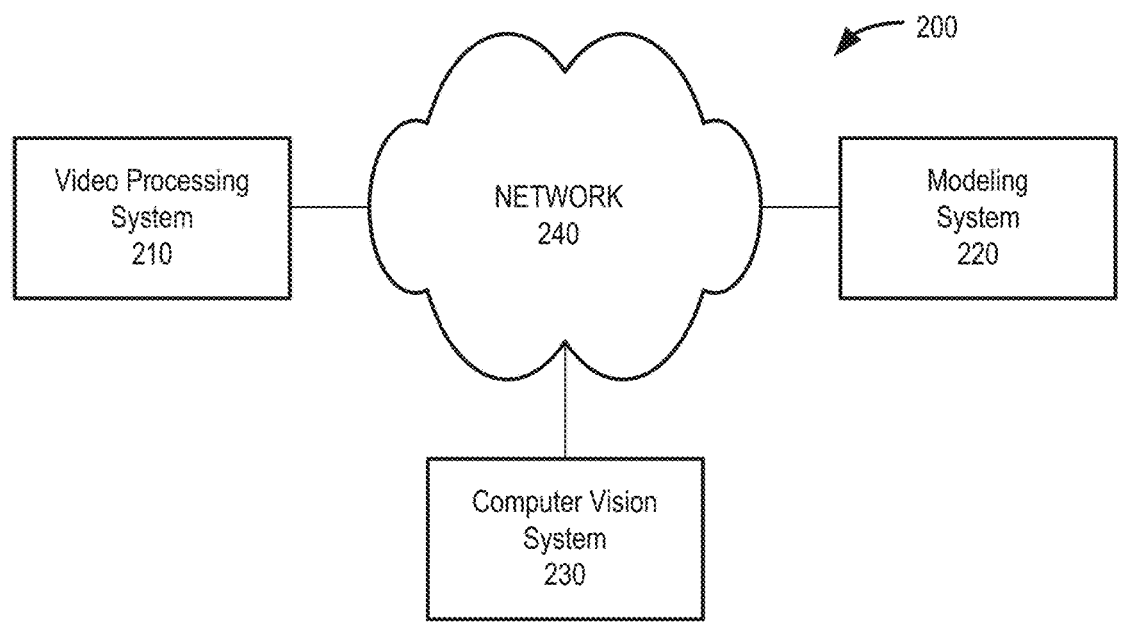
FIG. 2 is a diagram that depicts an exemplary network environment in which systems and methods described herein may be implemented.

FIG. 2 is an example of a network environment 200 in which systems and/or methods described herein may be implemented. As illustrated, network environment 200 may include a video processing system 210, a modeling system 220, and a computer vision system 230 interconnected by a network 240. Components of network environment 200 may be connected via wired and/or wireless links. According to an implementation, video processing system 210 and modeling system 220 may correspond to components for real-time occlusion removal system 50, which may be located locally with respect to camera 10, as shown in FIG. 1, or located remotely with respect to camera 10.

Video processing system 210 may include a processor, a computing device, or a network device to process a video feed or stream from one or more content sources (e.g., camera 10) as described further herein. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. As described in more detail below, video processing system 210 may identify objects for tracking, detect objects that are occluded (or at least partially occluded from view of camera 10), retrieve a previous frame that has a complete view of the later occluded object, and generate synthetic pixels to complete an occluded object. According to an implementation, video processing system 210 may apply one or more trained models to real-time video frames. One model may include an object detection model trained to identify objects of interest and occlusions. Another trained model may be trained to generate synthetic data for occluded objects. One or both of these models may be trained for a particular camera feed (e.g., for a fixed viewpoint of a camera, such as camera 10).

Modeling system 220 may include one or more devices, such as computer devices and/or server devices, to generate an object model based on a received image captured by a camera (e.g., camera 10). In some implementations, the generated model may correspond to a two-dimensional (2D) model. A 2D model may be generated using object recognition techniques, such as edge detection, edge matching, shape detection, gradient matching, histogram analysis, and/or another type of object recognition. In other implementations, the generated model may correspond to a 3D model generated based on depth information associated with the image. In one example, modeling system 220 use a training set to train a generative adversarial network (GAN) for real-time occlusion removal system 50, set hyperparameters for particular neural networks in the GAN, perform validation of training for the GAN, and/or otherwise manage the training and/or operation of a GAN associated with real-time occlusion removal system 50.

Computer vision system 230 may analyze video captured by a camera (e.g., camera 10) to determine whether people/objects are exhibiting particular behaviors or patterns of interest. According to an implementation, computer vision system 230 may perform object detection and tracking for a designated area, such as a retail store entrance, a warehouse, etc. For example, computer vision system 230 may include an object tracking system that uses images from video processing system 210 to count customer traffic (e.g., people) for a retail store-front or entrance, where the customer count may be relevant for monitoring for a maximum occupant capacity or retail analysis. In another example, computer vision system 230 may monitor pedestrian traffic for a portion of a theme park.

Network 240 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element in FIG. 2, network 240 may include a number of separate networks that function to provide services for the real-time occlusion removal system. Thus, the real-time occlusion removal system 50 may be implemented locally (e.g., at customer premises), remotely (e.g., as a cloud- or edge-based network service), or in a distributed environment.

In FIG. 2, the particular arrangement and number of components of network environment 200 are illustrated for simplicity. In practice, network environment 200 may include more video processing systems 210, modeling systems 220, computer vision systems 230, or networks 240.

Figure 3:
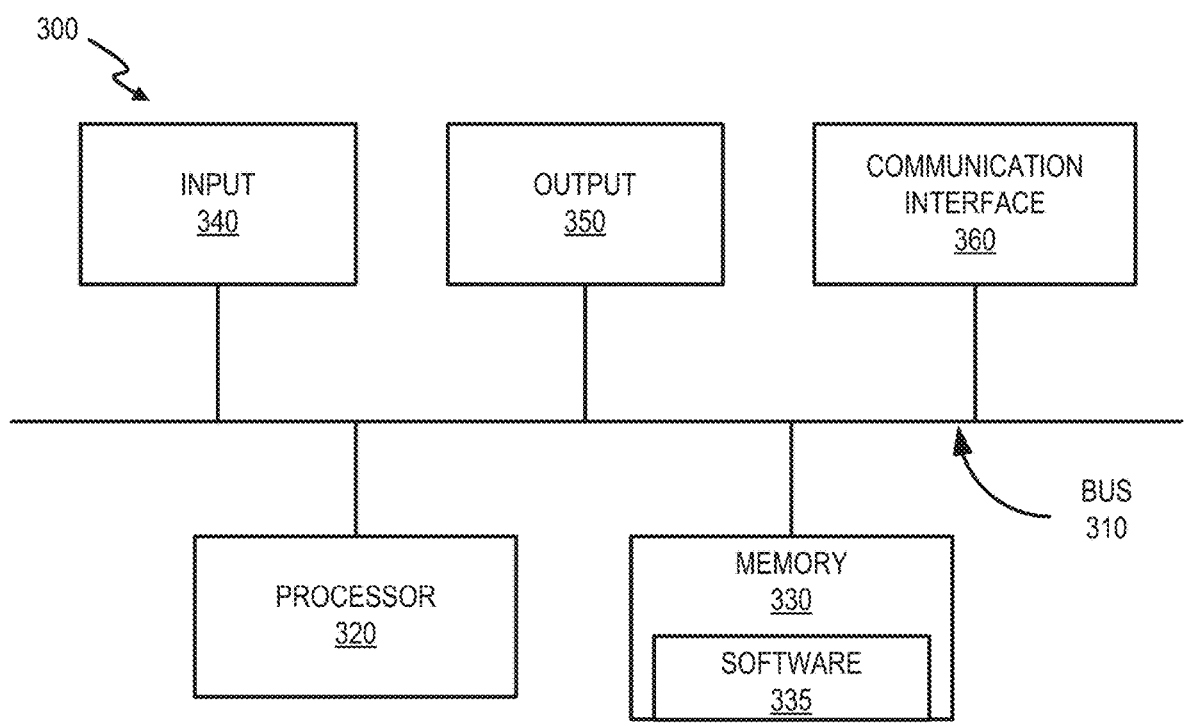
FIG. 3 depicts example components of a network device, according to an implementation.

FIG. 3 is a diagram illustrating exemplary components of a device 300. Video processing system 210, modeling system 220, computer vision system 230, or another device in network environment 200 may each include one or more devices 300 or may be implemented on one of more devices 300. As shown in FIG. 3, device 300 may include a bus 310, a processor 320, a memory 330 including software 335, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logic) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information (e.g., software 335, data, etc.) for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 335 includes an application or a program that provides a function and/or a process. Software 335 may also include firmware, middleware, microcode, hardware description language (HDL), and/or other form of instruction. By way of example, with respect to computing elements that include logic to generate models to provide real-time occlusion removal, these network elements may be implemented via software 335.

Input device 340 may allow an operator to input information into device 300. Input device 340 may include, for example, a keyboard, a mouse, a pen, a microphone, a remote control, an audio capture device, an image and/or video capture device such as camera 10, a touch-screen display, and/or another type of input device. In some embodiments, device 300 may be managed remotely and may not include input device 340.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350.

Communication interface 360 may include a transceiver that enables device 300 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating real-time occlusion removal using synthetic pixel generation. Device 300 may perform these operations in response to processor 320 executing instructions (e.g., software 335) contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
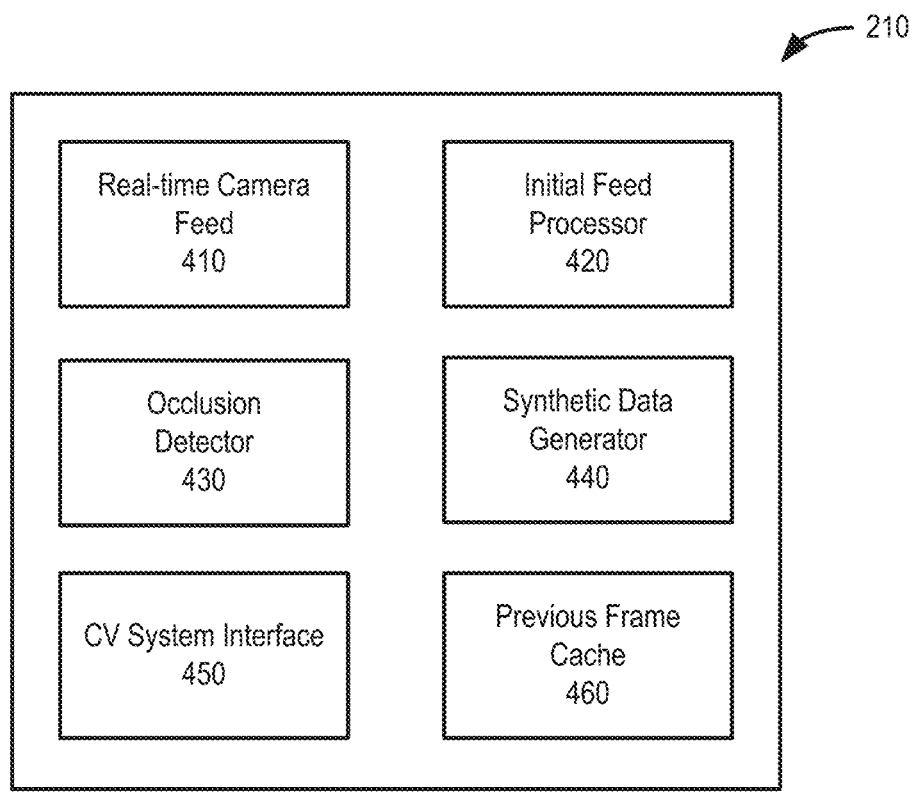
FIG. 4 is a diagram of examples of logical components that may be included in a video processing system, according to an implementation.

FIG. 4 is a block diagram illustrating examples of logical components of video processing system 210. The components of video processing system 210 may be implemented, for example, via processor 320 executing software 335 from memory 330. Alternatively, some or all of the components of video processing system 210 may be implemented via hard-wired circuitry.

As shown in FIG. 4, video processing system 210 may include a real-time camera feed 410, an initial feed processor 420, an occlusion detector 430, a synthetic data generator 440, a computer vision (CV) system interface 450, and a previous frame cache 460. Real-time camera feed 410 may be configured to receive a video or image stream from a camera (e.g., camera 10). According to an implementation, real-time camera feed 410 may receive individual frames and cache/buffer the frames.

Initial feed processor 420 may perform initial object detection and other processing of each frame received by real-time camera feed 410. For example, initial feed processor 420 may detect one or more objects of interest (e.g., persons, vehicles, etc.) in a frame. According to an implementation, initial feed processor 420 may store a computer vision model trained to identify different types of fixed objects (e.g., furnishings, structures, etc.) and mobile objects (e.g., people, carts, vehicles, etc.). For example, initial feed processor 420 may identify some features of an object that may indicate a person. In one implementation, initial feed processor 420 may annotate each frame of a video feed by labeling identified objects (e.g., as a person, stationary object, etc.), assign bounding boxes for each object, and assign unique identifiers for each object.

Occlusion detector 430 may determine if an object of interest (e.g., one of the objects identified by initial feed processor 420) in the frame is occluded. According to an implementation, occlusion detector 430 may store an object detector model trained to identify occlusions of objects of interest, such as mobile objects (e.g., people). For example, given a current and previous annotated frame (e.g., from initial feed processor 420), occlusion detector 430 may identify changes to a bounding box that may indicate an occluded object. Occlusion detector 430 may segment portion(s) of a current frame that appear to include an occlusion, for subsequent correction/modification by synthetic data generator 440. Occlusion detector 430 is described further below in connection with FIG. 5.

Synthetic data generator 440 may receive an indication of an occluded region in the current image frame and generate new data for the object of interest in the occluded region. According to an implementation, synthetic data generator 440 may apply a trained model (which may be trained for a particular view for a camera (e.g., camera 10)) to perform synthetic pixel generation that simulates a portion of an occluded object. In response to an indication of the occlusion, synthetic data generator 440 may retrieve data for the object from a previous frame that includes a complete view of the object. The previous frame may be the immediately preceding frame or one of multiple preceding frames. Synthetic data generator 440 may match the complete object view from the previous frame to the partial object in the current frame and replace the occluded portion with new synthetic pixels based on the complete object view in the previous fame.

Computer vision (CV) system interface 450 may maintain the video frame sequence and forward the modified frame from synthetic data generator 440 that includes the synthetic pixels to computer vision system 230.

Previous frame cache 460 may buffer frames for comparison with subsequent frames. According to an implementation, previous frame cache 460 may store modified frames with synthetic pixels (as provided by synthetic data generator 440). In other implementations, previous frame cache 460 may store previous original frames from camera 10 and/or previous annotated frames from initial feed processor 420.

Figure 5:
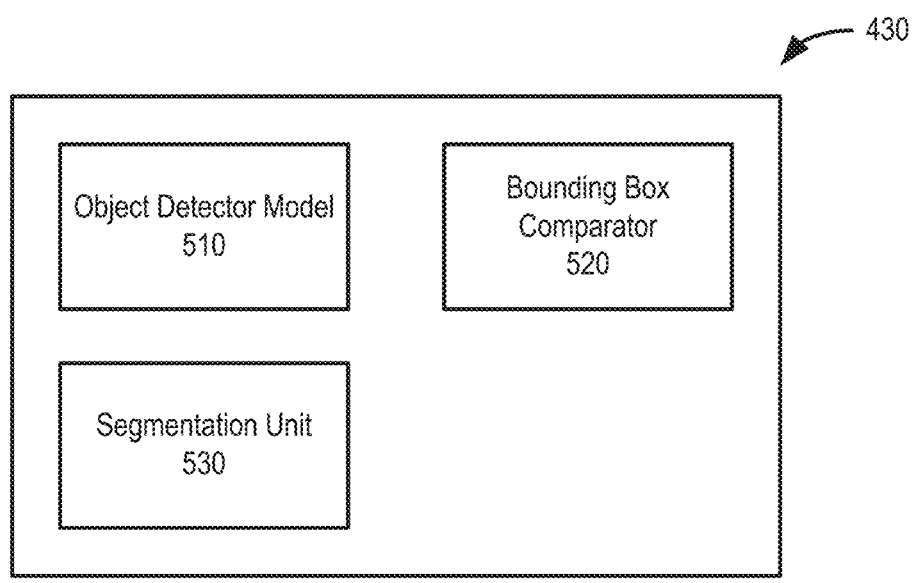
FIG. 5 is a block diagram illustrating examples of logical components of an occlusion detector, according to an implementation.

FIG. 5 is a block diagram illustrating examples of logical components of occlusion detector 430. As shown in FIG. 5, occlusion detector 430 may include an object detector model 510, bounding box comparator 520, and segmentation unit 530.

Object detector model 510 may identify objects of interest in each frame, such as a previous frame and a current frame in a video sequence. For example, depending on the purpose of computer vision system 230, object detector model 510 may identify people, vehicles, or other mobile objects. If not already applied by initial feed processor 420, object detector model 510 may generate bounding boxes around objects of interest.

Bounding box comparator 520 may compare the bounding boxes of sequential frames (e.g., a current frame and a previous frame) to detect changes. For example, bounding box comparator 520 may compare images within the bounding box of an annotated object in the current frame with the bounding box of the same annotated object in the previous frame. In some instances, bounding box comparator 520 may determine, based on the comparison, that images within a bounding box for an object in a current frame are not occluded. In other instances, bounding box comparator 520 may determine, based on the comparison, that images within a bounding box for an object in a current frame are occluded. Bounding box comparator 520 may, for example, detect overlapping bounding boxes that could indicate that a portion of the object is blocked by a stationary object or mobile object.

Segmentation unit 530 may identify an occluded portion of a bounding box. For example, when bounding box comparator 520 identifies a bounding box that includes an occlusion, segmentation unit 530 may isolate pixels that form the occluded portion of the bounding box. The isolated pixels indicate an area where synthetic pixel generation can be applied.

Figure 6:
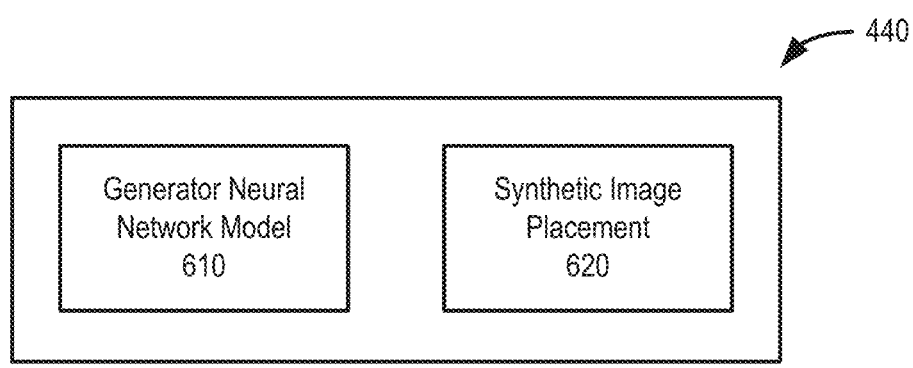
FIG. 6 is a block diagram illustrating examples of logical components of a synthetic data generator, according to an implementation.

FIG. 6 is a block diagram illustrating examples of logical components of synthetic data generator 440. As shown in FIG. 6, synthetic data generator 440 may include generator neural network model 610 and a synthetic image placement unit 620.

Generator neural network model 610 may include a trained model to generate images. For example, as further described below in connection with FIG. 7, modeling system 220 may train generator neural network model 610 as part of a GAN and provide the trained model to video processing system 210. Generator neural network model 610 may be configured to receive a segmented frame from occlusion detector 430 (e.g., segmentation unit 530) and generate a synthetic image to replace the occluded portion of an object of interest. The synthetic image may be generated based on an un-occluded view of the object in a previous frame.

Synthetic image placement unit 620 may add the synthetic images from generator neural network model 610 to the segmented portion of a current frame (e.g., received from segmentation unit 530). Synthetic image placement unit 620 may replace the occlusion in the original image with the new synthetic image to form a modified current frame. The modified current frame may then be forwarded to a computer vision system 230 for object detection, tracking, and/or other services.

Figure 7:
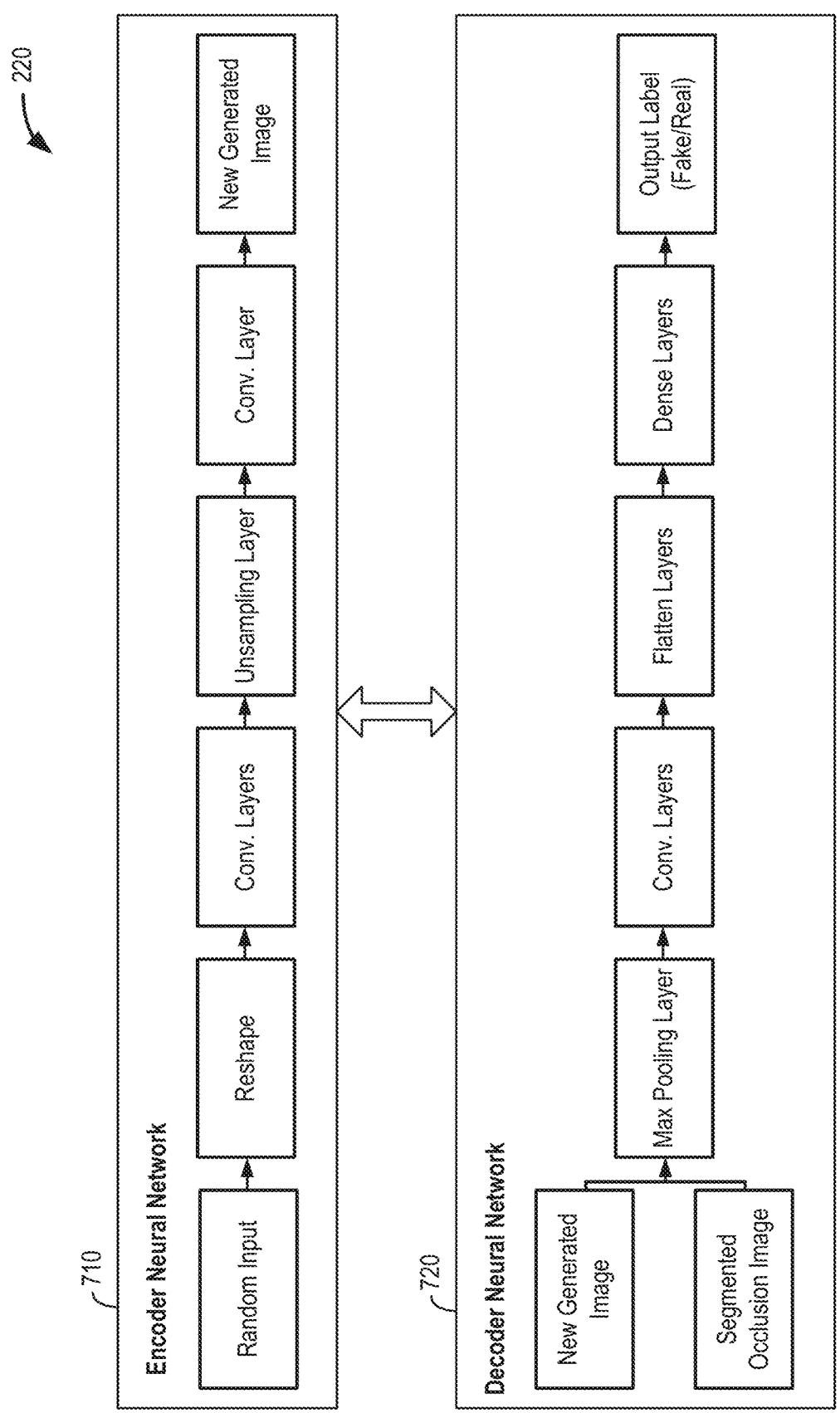
FIG. 7 is a block diagram illustrating logical components of a model generator for a synthetic data generator, according to an implementation.

FIG. 7 is a diagram illustrating logical components of modeling system 220 for synthetic pixel generation. Modeling system 220 may include an encoder neural network 710 and a decoder neural network 720. According to an implementation, modeling system 220 may combine neural networks 710 and 720 to form a generative adversarial network (GAN). Generally, as a GAN, neural networks 710 and 720 may compete with each other in a zero-sum game. Encoder neural network 710 may be a generator neural network that generates data, and decoder neural network 720 may be a discriminative neural network that is trained using real data to discriminate the real data from the generated data.

In an example implementation of modeling system 220, the model type for encoder neural network 710 may be a convolutional neural network for image generation. Encoder neural network 710 may use convolutional layers with a Rectified Linear Unit (ReLU) activation function and a Wasserstein loss function. In this example, the model type for decoder neural network 720 may be an image classification model. Decoder neural network 720 may use convolutional layers and fully connected dense layers with a ReLU activation function and a Wasserstein loss function.

Decoder neural network 720 may be trained through backpropagation to minimize the error of discriminating the generated data of encoder neural network 710 from the real data, while encoder neural network 710 is trained through backpropagation to maximize the error of the decoder neural network 720. Over time, decoder neural network 720 becomes better at detecting the generated data from encoder neural network 710 and encoder neural network 710 becomes better at generating data that is more similar to the real data.

According to implementations described herein, encoder neural network 710 includes a pixel generator to generate synthetic images, while decoder neural network 720 helps to improve the quality of the synthetic pixel generation by trying to classify or identify synthetic images as fake. Once trained, encoder neural network 710 may be separated from modeling system 220 and implemented in video processing system 210 (e.g., synthetic data generator 440).

In other implementations, modeling system 220 may include other (non-GAN) machine learning models, such as, for example, a K-nearest neighbors classifier, a decision tree classifier, a naïve Bayes classifier, a support vector machine (SVM) classifier, tree based (e.g., a random forest) classifier using Euclidian and/or cosine distance methods, and/or another type of classifier. Other configurations may be implemented. Therefore, modeling system 220 may include additional, fewer and/or different logical components than those depicted in FIG. 7.

According to various embodiments, encoder neural network 710 and decoder neural network 720 may have different parameters, including the type of generative model (e.g., autoencoder, variational encoder, GAN, etc.), neural network connectivity pattern (e.g., shallow, fully connected, convolutional, attention, recursive, long short-term memory (LSTM), etc.), neural network geometry (e.g., Euclidian, Riemannian, hyperbolic, etc.), encoding dimension, disentanglement control parameter, number of hidden layers, recurrence type (e.g., space, time, space and time), loss (e.g., cross entropy, adversarial, variational, Gaussian mixture, Wasserstein, etc.), optimizer type (e.g., Adam, stochastic gradient descent (SGD), RMSProp, Adagrad, etc.), activation function type (e.g., Rectified Linear Unit (ReLU), Sigmoid, Tanh, etc.), hyperparameters of an optimizer (e.g., learning rate, decay rate, step size, batch size, etc.), hyperparameters of neural network (e.g., number of layers, number of units at each layer, dropout rate at each layer, L1 or L2 regularization parameters, etc.), hyperparameters of a convolutional layer (e.g., window size, stride value, pooling layers, etc.), and/or other types of hyperparameters pertaining to a generative model.

Figure 8:
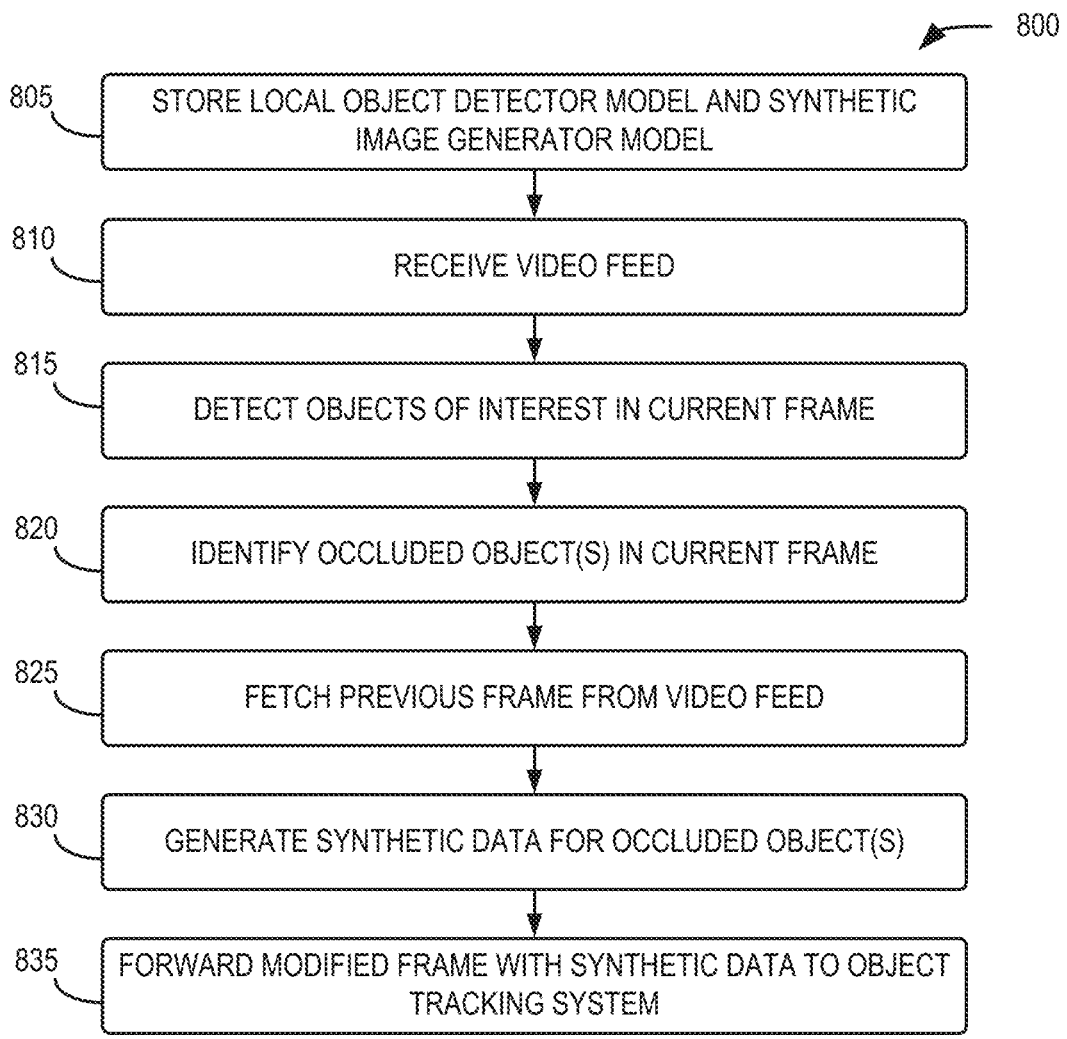
FIGS. 8-10 are flow diagrams of a process for performing real-time occlusion removal using synthetic pixel generation, according to an implementation described herein.
Figure 9:
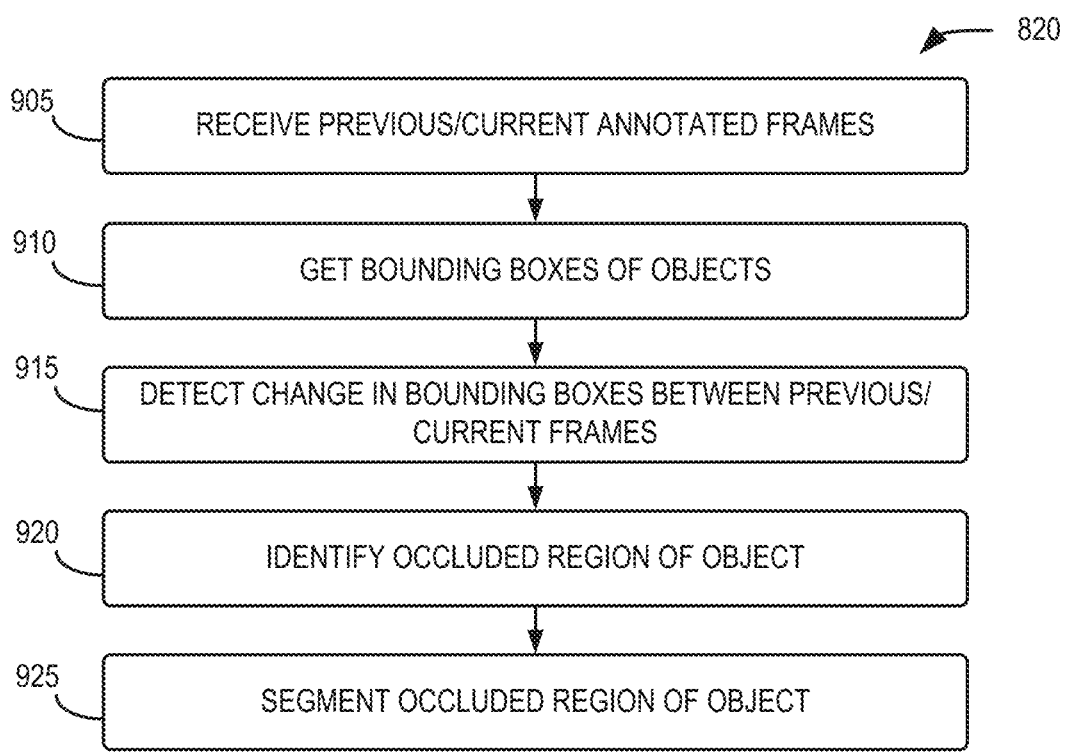
Figure 10:
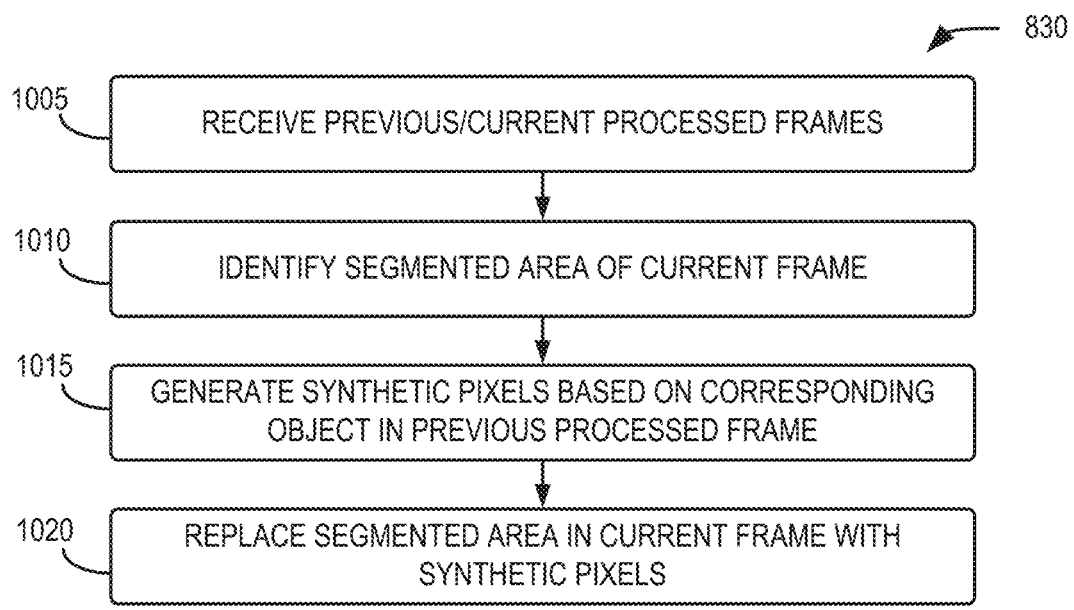

FIGS. 8-10 are flow diagrams illustrating a process 800 for performing real-time occlusion removal using synthetic pixel generation. In one implementation, process 800 may be implemented by video processing system 210. In another implementation, process 800 may be implemented by video processing system 210 in conjunction with one or more other devices in environment 200, such as modeling system 220 and computer vision system 230. Descriptions of steps in FIGS. 8-10 may refer to illustrations in FIGS. 11A-11D.

Process 800 may include storing an object detector model and a synthetic image generator model (block 805) and receiving a video feed (block 810). For example, along with an initial processing model, video processing system 210 may receive object detector model 510 and generator neural network model 610 that may be trained with respect to the view of a fixed camera (e.g., camera 10) that provides the video feed. Real-time camera feed 410 may receive individual frames and cache/buffer frames.

Figure 11A:
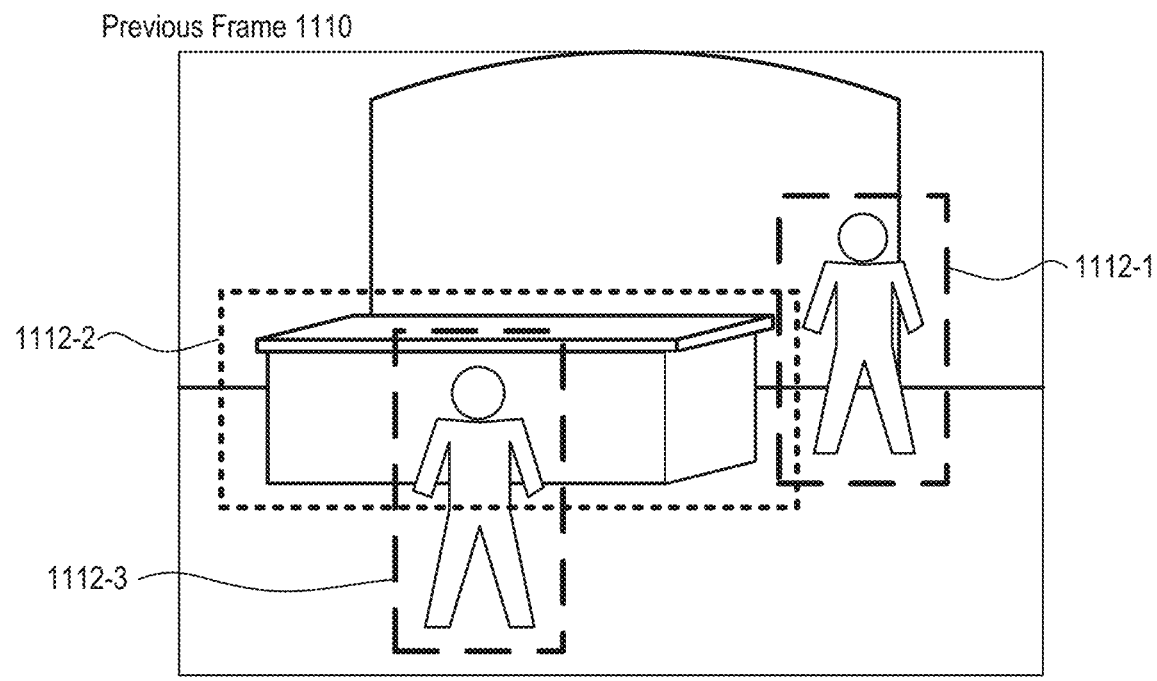
FIGS. 11A-11D are illustrations corresponding to a process for performing real-time occlusion removal.
Figure 11B:
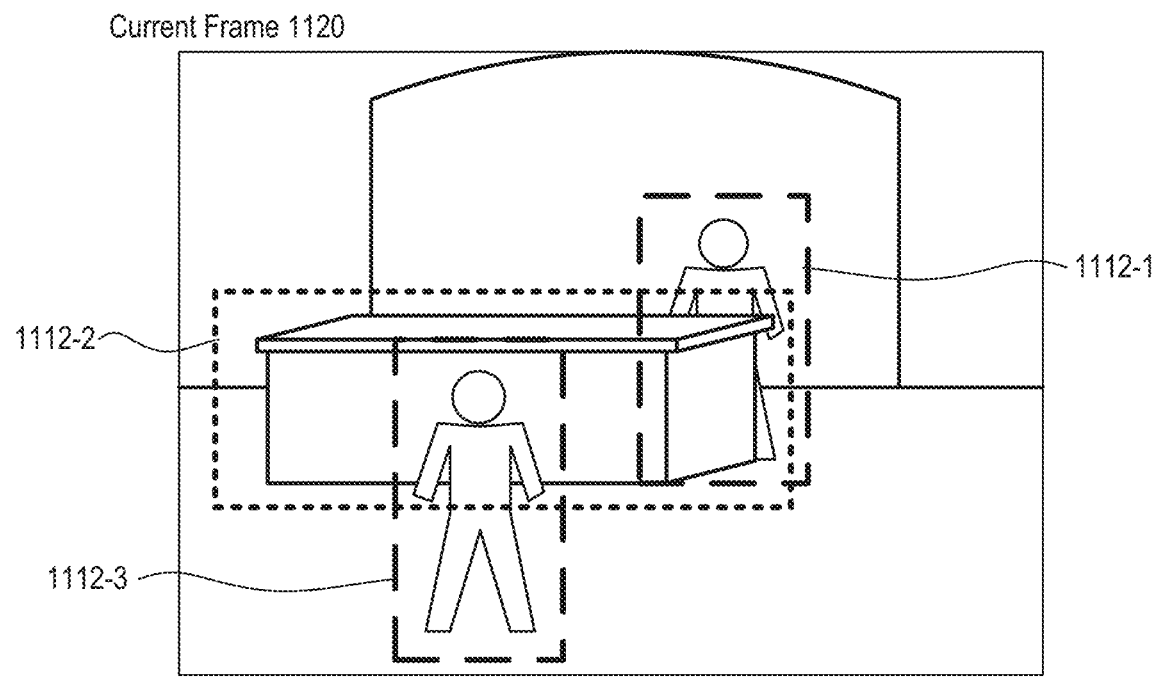

Process 800 may further include detecting objects of interest in a current frame of the video feed (block 815), and identifying an occluded object in the current frame (block 820). For example, initial feed processor 420 may detect and annotate objects in a frame. Referring to FIGS. 11A and 11B, for example, initial feed processor 420 may process a previous frame 1110 and a current frame 1120, assigning bounding boxes 1112 to identified objects. Based on the stored object detector model, occlusion detector 430 may determine if an object of interest (e.g., one of the objects identified by initial feed processor 420) in the frame is occluded.

Process 800 may also include fetching (or retrieving) a previous frame from the video feed (block 825), generating synthetic data for the one or more occluded objects (block 830), and forwarding a modified frame with the synthetic data to an object tracking system (block 835). For example, when an occlusion is detected, occlusion detector may indicate an occluded area and forward the current frame to synthetic data generator 440. Synthetic data generator 440 may apply generator neural network model 610 (which may be trained for a particular view of a camera 10) to perform synthetic pixel generation in the indicated area based on a previous frame (e.g., that has an unobstructed view of the object) from cache 460.

Process block 820 may include blocks described in FIG. 9. As shown in FIG. 9, process block 820 may include receiving a previous frame and a current frame of the annotated video feed (block 905), identifying bounding boxes of the objects (block 910), and detecting a change between the bounding boxes of a previous and current frame (block 915). For example, object detector model 510 may identify annotated objects of interest (e.g., people) in each frame, such as a previous frame and a current frame in a video sequence. Referring to FIGS. 11A and 11B, for example, previous frame 1110 and a current frame 1120 may be annotated with bounding boxes 1112-1, 1112-2, and 1112-3. Bounding box comparator 520 may compare the bounding boxes of the current frame and a previous frame to detect changes indicative of an occlusion, such as overlapping bounding boxes. For example, referring to FIG. 11B, bounding box comparator 520 may examine the bounding boxes 1112-1 and 1112-2 to determine that a person is behind a stationary object (e.g., a counter in FIG. 11B).

Process block 820 may also include identifying the occluded region of an object (block 920) and segmenting the occluded region (block 925). For example, when bounding box comparator 520 identifies a bounding box that includes an occlusion, segmentation unit 530 may isolate pixels that form the occluded portion of the bounding box. The isolated pixels indicate an area where synthetic pixel generation can be applied. For example, referring to FIG. 11C, segmentation unit 530 may identify an area 1114 where bounding boxes 1112-1 and 1112-2 overlap and provide a segmented current frame 1130.

Figure 11C:
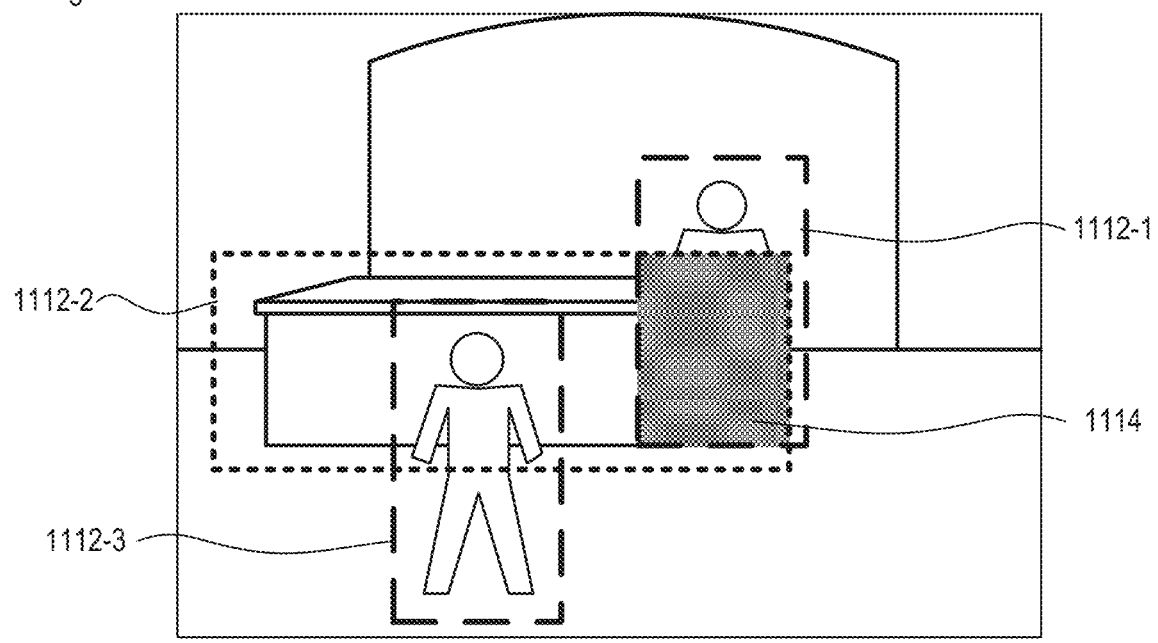
Figure 11D:
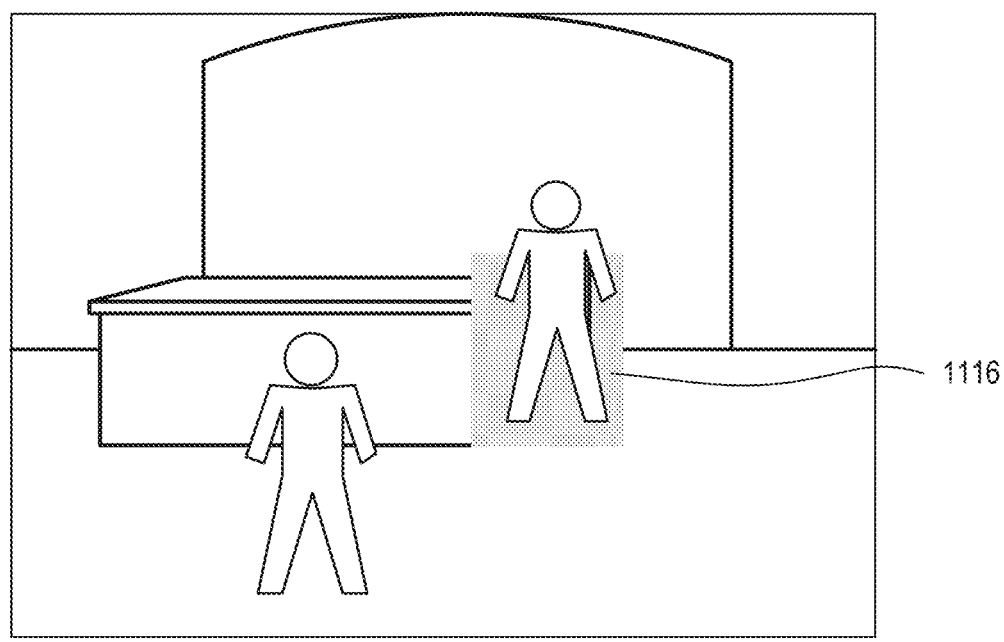

Process blocks 830 may include blocks described in FIG. 10. As shown in FIG. 10, process block 830 may include receiving previous/current processed frames (block 1005), and identifying a segmented area of the current frame (block 1010). For example, generator neural network model 610 may be configured to receive a segmented frame from occlusion detector 430 (e.g., segmentation unit 530). The segmented frame may indicate the location where synthetic pixels of an object are required. For example, referring to FIG. 11C, area 1114 may be segmented where bounding boxes 1112-1 and 1112-2 overlap.

Process block 830 may also include generating a synthetic segment based on the corresponding object in the previous processed frame (block 1015), and replacing the segmented area with the synthetic pixels (block 1020). For example, generator neural network model 610 may also obtain a previous frame of the video feed, which may be an annotated frame (e.g., via initial feed processor 420) or a previously modified frame (e.g., from previous frame cache 460). Generator neural network model 610 may generate a synthetic image to replace the occluded portion of an object of interest. The synthetic image may be generated based on an un-occluded view of the object in one or more previous frames. For example, referring to FIG. 11D, generator neural network model 610 may use the unobstructed view within bounding box 1112-1 of previous frame 1110 to generate synthetic image 1116 (e.g., over the segmented area 1114 of segmented current frame 1130) for the modified current frame 1140. Although modified current frame 1140 provides a distorted or modified view of reality by removing a portion of an object (in this case, stationary object 1112-2), synthetic image 1116 provides a more effective frame for use in object tracking systems, for example.

Systems and methods described herein utilize synthetic pixel generation using a custom neural network to generate synthetic versions of objects hidden by occlusions for effective detection and tracking. A computing device stores an object detector model and a synthetic image generator model; receives a video feed; detects objects of interest in a current frame of the video feed; identifies an occluded object in the current frame; fetches a previous frame from the video feed; generates synthetic data based on the previous frame for the occluded object; and forwards a modified version of the current frame to an object tracking system, wherein the modified version of the current frame includes the synthetic data.

In contrast with implementations described herein, other computer vision detection systems (e.g., without real-time occlusion removal using synthetic pixel generation) may provide high detection rates, but may also generate a high rate of false detections. Particularly, the same individual objects are more likely to be counted and/or tracked as different objects in different frames when tracking in crowded environments.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 8-10, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
    storing, by a computing device, an object detector model and a synthetic image generator model;
    receiving, by the computing device, a video feed;
    detecting, by the computing device, objects of interest in a current frame of the video feed, wherein the objects of interest include fixed objects and moveable objects, and wherein detecting the objects of interest further comprises annotating the objects of interest in the current frame to include a bounding box for each of the objects of interest;
    identifying, by the computing device, an occluded object in the current frame, wherein the identifying includes:
        identifying bounding boxes that overlap in the current frame,
        detecting an occlusion of one of the moveable objects within one of the bounding boxes, and
        defining a segmented portion, of the one of the bounding boxes, that corresponds to the overlap;
    retrieving, by the computing device and from a previous frame cache, a previously annotated frame from the video feed;
    generating, by the computing device, synthetic data for the segmented portion based on the previously annotated frame for the occluded object;
    forwarding, by the computing device, a modified version of the current frame to an object tracking system, wherein the modified version of the current frame includes the synthetic data;
    storing, by the computing device and in the previous frame cache, the modified version of the current frame; and
    generating, by the computing device, synthetic data for the occluded object in a next frame of the video feed based on the modified version.

2. The method of claim 1, wherein detecting the objects of interest further comprises:
    annotating the objects of interest as one of a fixed object or a movable object.

3. The method of claim 1, wherein forwarding the modified version of the current frame incudes:
    maintaining a video frame sequence of the video feed.

4. The method of claim 1, wherein generating the synthetic data includes:
    generating synthetic pixels based on an object in the previously annotated frame that is the same as the occluded object in the current frame, wherein the object in the previously annotated frame is not occluded, and
    replacing the segmented portion of the occluded object in the current frame with the synthetic pixels.

5. The method of claim 4, wherein the synthetic image generator model includes a trained neural network model, and
    wherein, when generating the synthetic pixels, the computing device applies the synthetic image generator model.

6. The method of claim 1, further comprising:
    training the synthetic image generator model using a generative adversarial network (GAN).

7. The method of claim 6, wherein training the synthetic image generator model includes training the synthetic image generator model with respect to the view of a camera that provides the video feed.

8. The method of claim 1, wherein the occluded object is a person, and wherein the object tracking system tracks customers for a retail store entrance.

9. A computing device comprising:
    a processor configured to:
        store an object detector model and a synthetic image generator model;
        receive a video feed;
        detect objects of interest in a current frame of the video feed, wherein the objects of interest include fixed objects and moveable objects, and wherein detecting the objects of interest further comprises annotating the objects of interest in the current frame to include a bounding box for each of the objects of interest;
        identify an occluded object in the current frame, wherein the identifying includes:

identifying bounding boxes that overlap in the current frame,
detecting an occlusion of one of the moveable objects within one of the bounding boxes, and
defining a segmented portion, of the one of the bounding boxes, that corresponds to the overlap;
retrieve, from a previous frame cache, a previously annotated frame from the video feed;
generate synthetic data for the segmented portion based on the previously annotated frame for the occluded object;
forward a modified version of the current frame to an object tracking system, wherein the modified version of the current frame includes the synthetic data;
store, in the previous frame cache, the modified version of the current frame; and
generate synthetic data for the occluded object in a next frame of the video feed based on the modified version.

10. The computing device of claim 9, wherein, when detecting the objects of interest, the processor is further configured to:
annotate the objects of interest as one of a fixed object or a movable object.

11. The computing device of claim 9, wherein, when forwarding the modified version of the current frame, the processor is further configured to:
maintain a video frame sequence of the video feed.

12. The computing device of claim 9, wherein, when generating the synthetic data, the processor is further configured to:
generate synthetic pixels based on an object in the previously annotated frame that is the same as the occluded object in the current frame, wherein the object in the previously annotated frame is not occluded, and
replace the segmented portion of the occluded object in the current frame with the synthetic pixels.

13. The computing device of claim 12, wherein the synthetic image generator model includes a trained neural network model.

14. The computing device of claim 9, wherein the processor is further configured to:
train the synthetic image generator model using a generative adversarial network (GAN).

15. The computing device of claim 14, wherein, when training the synthetic image generator model, the processor is further configured to:
train the synthetic image generator model with respect to the view of a fixed camera that provides the video feed.

16. The computing device of claim 9, wherein the synthetic data simulates a portion of the occluded object.

17. A non-transitory computer-readable medium storing instructions, which are executable by one or more processors, for:

storing an object detector model and a synthetic image generator model;
receiving a video feed;
detecting objects of interest in a current frame of the video feed, wherein the objects of interest include fixed objects and moveable objects, and wherein detecting the objects of interest further comprises annotating the objects of interest in the current frame to include a bounding box for each of the objects of interest;
identifying an occluded object in the current frame, wherein the identifying includes:
identifying bounding boxes that overlap in the current frame,
detecting an occlusion of one of the moveable objects within one of the bounding boxes, and
defining a segmented portion, of the one of the bounding boxes, that corresponds to the overlap;
retrieving, from a previous frame cache, a previously annotated frame from the video feed;
generating synthetic data for the segmented portion based on the previously annotated frame for the occluded object;
forwarding, by the computing device, a modified version of the current frame to an object tracking system, wherein the modified version of the current frame includes the synthetic data;
storing, in the previous frame cache, the modified version of the current frame; and
generating synthetic data for the occluded object in a next frame of the video feed based on the modified version.

18. The non-transitory computer-readable medium of claim 17, wherein the objects of interest include people, and wherein the instructions for detecting the objects of interest further comprise instructions for:
annotating the objects of interest in the current frame to include bounding boxes for the people.

19. The non-transitory computer-readable medium of claim 17, wherein the instructions for forwarding the modified version of the current frame further comprise instructions for:
maintaining a video frame sequence of the video feed.

20. The non-transitory computer-readable medium of claim 17, wherein the instructions for generating the synthetic data further comprise instructions for:
generating synthetic pixels based on an object in the previously annotated frame that is the same as the occluded object in the current frame, wherein the object in the previously annotated frame is not occluded, and
replacing the segmented portion of the occluded object in the current frame with the synthetic pixels.

* * * * *